United States Patent [19]

Bell

[11] Patent Number: 4,773,547

[45] Date of Patent: Sep. 27, 1988

[54] STACKABLE AND NESTABLE STORAGE RACK

[76] Inventor: Ferris A. Bell, 10 Summerhill La., Town and Country, Mo. 63011

[21] Appl. No.: 10,299

[22] Filed: Feb. 2, 1987

[51] Int. Cl.[4] .............................................. A47B 47/00
[52] U.S. Cl. .................................... 211/194; 108/53.1
[58] Field of Search ............... 211/194, 191, 189, 126; 108/53.1–53.5, 55.1, 55.5, 55.6, 53

[56] References Cited

U.S. PATENT DOCUMENTS

| | | | |
|---|---|---|---|
| 2,699,911 | 1/1955 | Chase et al. | 248/120 |
| 3,499,398 | 3/1970 | Murray | 108/53 |
| 3,502,227 | 3/1970 | Konstant et al. | 211/126 |
| 3,517,828 | 6/1970 | Hunter | 211/194 |
| 3,565,018 | 2/1971 | Jay | 108/53 |
| 3,945,501 | 3/1976 | Jay | 211/177 |
| 4,191,112 | 3/1980 | Maldonado | 108/53.3 |
| 4,199,069 | 4/1980 | Talarico | 211/194 |
| 4,266,678 | 5/1981 | Daly | 211/194 |

FOREIGN PATENT DOCUMENTS

711071  6/1954  United Kingdom .................. 108/53

Primary Examiner—Reinaldo P. Machado
Assistant Examiner—Sarah A. Lechok Eley
Attorney, Agent, or Firm—Haverstock, Garrett & Roberts

[57] ABSTRACT

A storage rack for storing goods and/or materials in a stackable arrangement thereon including a base member and a plurality of elongated support members cooperatively engageable with the base member at spaced locations thereon, some of the support members including a target at the upper end portion thereof and some including a stacking projection. The underside portion of the base member likewise includes stacking projections and targets which are cooperatively engageable with the projections and targets associated with the support members, the base projections and base targets being located such that, when the support members are properly located and engaged with a first base member, a second base member may be vertically stackably arranged in mating relationship thereabove. The construction of the present base members also enables the base members to be stackably arranged one upon the other in an unassembled condition for ease of storage and transportation. A pair of nesting sockets is provided on the base member for enabling the present units to be nested one upon and within the other in both an assembled as well as an unasembled condition. All of the targets associated with the present rack construction are positioned such that they do not protrude beyond the perimeter of the base member. The construction of the present targets also provides a substantially broader target area for aligning the stacking projections with cooperatively engageable openings located within each target for facilitating the vertical assembly thereof.

8 Claims, 8 Drawing Sheets

STACKABLE AND NESTABLE STORAGE RACK

The present invention relates to a storage rack adaptable for stackably accommodating the storage of goods and materials thereon, and, more particularly, to an improved storage rack construction which is both stackable and nestable in an assembled as well as an unassembled condition. The present rack assembly is particularly adaptable for use in a warehouse type environment and includes a base frame member and a plurality of elongated support members, the support members each having one end portion correspondingly shaped to cooperatively engage any one of a plurality of stacking sockets positioned at approximately the respective corners of the base frame member. Target means and projection means are associated with respective ones of the elongated support members as well as with the lower portion of the base frame member. The location, configuration and positioning of the target and projection means as well as the location and positioning of the stacking sockets enables the present storage racks to be vertically stacked in either an assembled or an unassembled condition. A pair of nesting sockets strategically positioned on the base frame member likewise enable the present storage racks to be nested one upon the other in either an assembled or an unassembled condition. The ability of the present rack assembly to be both stacked and nested in an unassembled or knock-down storage position provides for maximum utilization of floor space while its ability to be nested in an assembled condition conserves time and provides for immediate use when needed. Although the present rack assembly has particular utility in a warehouse type environment, it can likewise be utilized in a multiplicity of other storage applications.

There exists an ever increasing need and demand for an efficient, effective and economical storage rack assembly which is both stackable and nestable in an assembled as well as an unassembled condition to provide maximum flexibility to a user in order to conserve and minimize both floor space and assembly time while maximizing the storage of goods and materials on such assemblies. Many different types of storage racks have been designed and manufactured for use in a multitude of applications including for use in a warehouse type environment. Such known storage rack devices teach a wide variety of constructions including constructions which permit the vertical stacking of one rack upon the other as well as constructions which allow for the nestability of such units. The known storage rack devices which have nesting capability typically include a plurality of upper brace members positioned either wholly or partially outboard of the vertical support members associated therewith, the upper brace members providing strength and rigidity to the vertical support members. This arrangement has not been entirely satisfactory because the upper brace members associated with such units interfere with adjacent units when positioned in side-by-side abutting relationship with each other thereby producing unusable or lost space between such units. In addition, the known prior art nestable storage rack devices are of a one-piece construction and are not capable of being either stacked or nested in an unassembled or knock-down condition. Thus, these constructions require substantially more vertical space as compared to the present rack construction and are therefore more difficult and more expensive to both store and transport when not being used. Such prior art devices provide only limited options to a user when confronted with the storage and/or transportation of such units. See for typical examples the storage rack constructions shown in U.S. Pat. Nos. 4,191,112 and 3,945,501.

Other known storage rack constructions provide for the foldability of the vertical support members associated therewith to facilitate the handling and transportation of such units. See for typical examples the storage rack constructions shown in U.S. Pat. Nos. 3,565,018; 3,499,398; and 2,699,911. Still other storage rack constructions, although capable of being stacked in an unassembled or broken-down condition, are not nestable. See, for example, the construction shown in U.S. Pat. No. 4,199,069. The construction of still other known nestable units necessitates the lifting of one unit completely up and over the top of another unit since the nesting configuration of such units can only be achieved by inserting one unit within another. Since these units are not capable of being nested in any other manner, the procedure necessary for nesting such units requires considerably more vertical space and such nesting is therefore limited by the height of the space in which such units are being nested. All of these features associated with the known prior art devices have made such units overly complex, expensive, difficult and cumbersome to handle and transport from one location to another, and such units have not totally maximized the use of available floor space. None of the known prior art storage rack devices provide a unit which is both stackable and nestable in an assembled as well as an unassembled condition as is true of the present rack construction.

The present storage rack construction overcomes many of the disadvantages and shortcomings associated with the known constructions and teaches the construction and operation of a relatively simple storage rack which includes a base frame member and a plurality of elongated support members, the support members being cooperatively engageable with means located on both the upper and lower surfaces of the base frame member. Tubular shaped stacking sockets extend upwardly at approximately the respective corners of the base frame member and each is adapted to receive a correspondingly shaped end portion associated with each support member to fixedly maintain the support members in an upright substantially vertical position relative to the base frame member. The pair of spaced stacking sockets located at the forward end portion of the base frame member are each respectively located laterally outwardly from the spaced pair of stacking sockets located at the opposite rear end portion thereof to facilitate inserting one unit within another for nesting purposes. A nesting socket located adjacent to each of the front stacking sockets is provided to furnish a seat for the projection means located on the underside forward portion of the base frame member when the nesting configuration is desired. The location of the nesting sockets adjacent to, but forward from, the respective front stacking sockets as well as the position and location of the forward stacking sockets relative to the rear stacking sockets enables the present rack unit to be easily nested one upon the other in either an assembled or an unassembled condition as will be hereinafter more fully explained.

The upper portion of the elongated support members are constructed such that some members include target means while other support members include upwardly extending projecting means. These support members are arranged in association with each base frame member such that, when engaged with their respective stacking sockets, the two forward support members each include target means while the two rear support members each include the upwardly extending projecting means at the respective upper end portions thereof. Similarly, the underside portion of the base frame member includes means cooperatively engageable with the upper portions of each of the support members such that when the support members are properly positioned as described above within the stacking sockets of a first base frame member, a second base frame member may be vertically stackably arranged thereon in position to receive another plurality of support members, if desired. This stacking process may be continued to achieve any desired height. In this regard, the forward portion of each base frame member includes a pair of spaced projection means extending downwardly therefrom and the rear portion thereof includes a pair of spaced downwardly extending target means. The target means associated with both the base frame member and the support members each include an opening or aperture adaptable for cooperatively receiving and engaging one of the projection means associated with such members. The target means function to guide the projection means into proper alignment and engagement with the receiving aperture associated respectively therewith. More particularly, the downwardly extending front base projection means are dimensioned to cooperatively engage and seat within the respective opening or aperture associated with the target means located at the upper end portion of the forward support members while the projection means associated with the rear support members are dimensioned to cooperatively engage and seat within the respective opening or aperture associated with the rear base target means. Although the target means associated with the rear portion of the base frame member differ somewhat structurally from the target means associated with the front support members, all of the target means associated with the present rack assembly are positioned and dimensioned such that they do not extend or protrude beyond the outside perimeter of the base frame member and thus do not interfere with other similar rack units positioned adjacent thereto. This maximizes the utilization of available floor space and adjacent positioning of a plurality of the present rack units does not produce wasted or unusable space. The construction of the present target means also provides a substantially broader target area for aligning the projection means with the cooperatively engageable openings located therewithin for facilitating the vertical assembly thereof.

The present storage rack assembly overcomes many of the limitations and shortcomings discussed above with respect to the known assemblies because its construction enables the present units to be both stacked or nested in an unassembled knock-down storage condition for maximum utilization of space and it enables the present units to be also nested in an assembled condition for immediate use. The unassembled stacked condition of the present rack assembly requires less space depthwise than when the present units are nested in an unassembled condition and this capability provides a user with still another option when determining how best to store and/or transport the present rack units. Also, the target means of the present rack construction provide for greater latitude and a greater margin of error when attempting to align the projection means with the receiving aperture associated with each target means. Because of these capabilities, the present rack assembly provides simple and efficient means for effectively vertically stackably arranging the storage of goods and/or materials while at the same time maximizing the use of available floor space to accomplish the same.

It is therefore a principal object of the present invention to provide a storage rack which is both stackable and nestable in both an assembled and an unassembled condition.

Another object is to provide a storage rack which maximizes utilization of space.

Another object is to provide a storage rack which has no members protruding or extending beyond the outer perimeter defined by the base frame member.

Another object is to teach the construction of a storage rack which utilizes target means which provide a substantially broad target area for aligning the projection means with the receiving openings associated therewith for vertically stacking the units.

Another object is to provide a storage rack which affords a user several different options when determining how best to store and/or transport a plurality of such storage rack units.

Another object is to provide a storage rack which does not interfere with other racks positioned adjacent thereto and which does not have members which protrude into walkways or other storage space.

Another object is to provide a storage rack which reduces the time required to place such assemblies in a usable condition for accommodating the storage of goods and/or material thereon.

Another object is to provide a storage rack which conserves space and is structurally and operationally relatively simple and easy to install and to configure into an operational mode.

Another object is to provide a storage rack which is relatively more stable, durable and able to withstand moderate impact without collapsing and/or disassembly.

These and other objects and advantages of the present invention will become apparent to those skilled in the art after considering the following detailed specification of a preferred embodiment of the present rack assembly in conjunction with the accompanying drawings wherein:

Figure 1:
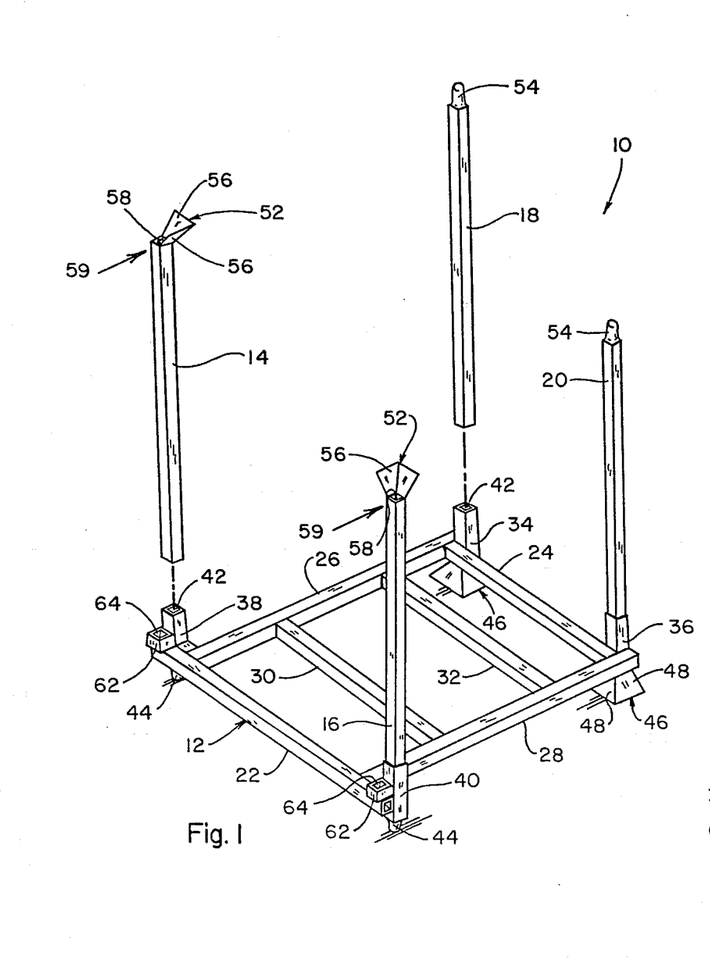
FIG. 1 is a partially exploded perspective view of a storage rack constructed according to the teachings of the present invention.
Figure 2:
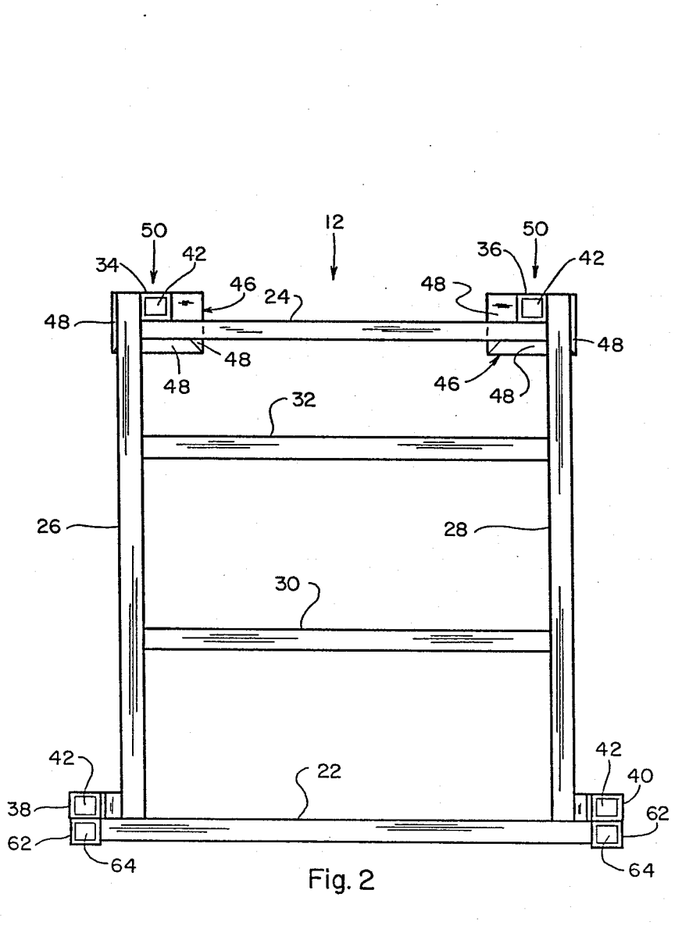
FIG. 2 is a top plan view of the base frame member of the storage rack in FIG. 1.

Referring to the drawings more particularly by reference numbers wherein like numerals refer to like parts, number 10 in FIG. 1 identifies a storage rack device constructed according to the teachings of the present invention. The storage rack 10 includes a base frame member 12, a pair of spaced upright support members 14 and 16 positioned at the forward portion of the base member 12, and a pair of spaced upright support members 18 and 20 positioned at the rear portion of the member 12. The base member 12 is made up of a plurality of elongated frame or rail type members 22, 24, 26 and 28 arranged in a substantially rectangular pattern as best shown in FIGS. 1 and 2. The front and rear transverse frame members 22 and 24 are fixedly attached respectively to the side frame members 26 and 28 by any suitable means such as by welding. Transverse brace memters 30 and 32 are positioned intermediate and parallel to the front and rear frame members 22 and 24 and extend between the side frame members 26 and 28 as shown in FIG. 2. The brace members 30 and 32 are similarly attached to the side frame members 26 and 28 by any suitable means. The position and location of the transverse brace members 30 and 32 provide added support, stability and ridigity to the base member 12 as well as to the overall rack unit 10, particularly when a plurality of such units 10 are vertically stackably arranged as will be hereinafter explained. Brace members 30 and 32 also function as lift support members for forklift type vehicles and provide the necessary support means for lifting the overall unit 10 when the forks of the lift vehicle are maneuvered therebeneath. It is recognized that both the location and number of the tranverse brace members 30 and 32 may vary depending upon a particular application. It is also anticipated that brace members extending between the front and rear frame members 22 and 24 and positioned intermediate and parallel to the side frame members 26 and 28 may likewise be utilized to add still further support and stability to the overall unit 10.

Figure 8:
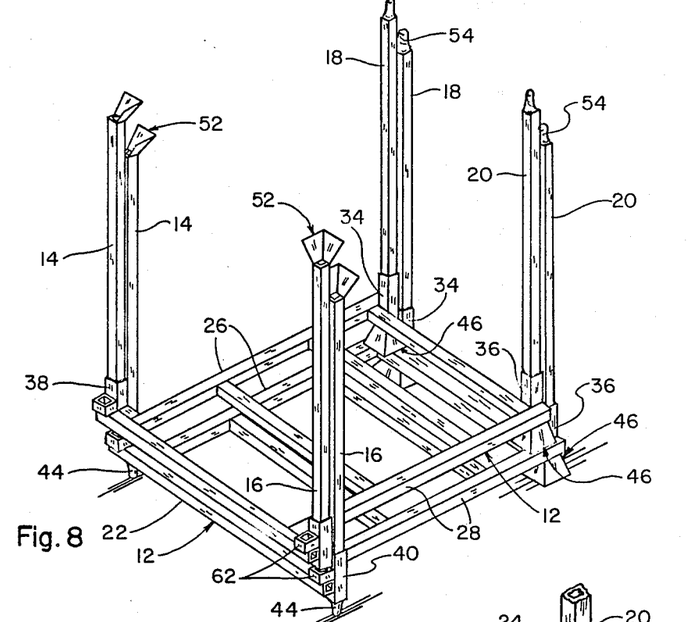
FIG. 8 is a perspective view of the storage racks of FIG. 7 shown in their nested assembled condition.

Stacking sockets 34, 36, 38 and 40 extend upwardly at approximately the respective corners of the base frame member 12 and each is adapted to receive the lower end portion of the upright support members 14–20. The stacking sockets 34–40 are preferably tubular in shape and are dimensioned such that the opening or aperture associated respectively therewith, such as the openings 42 (FIGS. 1 and 2), cooperatively or telescopingly receives and engages the lower portion of each of the upright support members 14–20 so as to fixedly maintain such support members in an upright substantially vertical position relative to the base frame member 12. Although each of the stacking sockets 34–40 are shown as being substantially rectangular in shape with a substantially rectangular opening 42 associated with the upper end portion thereof, it is recognized that both the size and shape of the sockets 34–40 as well as their respective associated opening 42 may be fashioned into a variety of different sizes and shapes, for example, triangular, circular, hexagonal, or some other configuration, without impairing the teachings of the present invention so long as the openings 42 are adapted to receive and hold the lower end portion of the respective support members 14–20. The height of the stacking sockets 34–40 above the frame work structure of the base member 12 can also be varied depending upon the overall length of the support members 14–20 as well as the weight capacity of the particular goods and/or materials to be stackably arranged on the present units 10. Regardless of their size and/or shape, the stacking sockets 34–40 should be constructed so as to extend upwardly a sufficient height both to provide stable and rigid stacking of the present units 10 one upon the other depending upon the particular load carrying capacity desired and to avoid interference with any pallet member which may be postioned across the base frame members 12 when the members 12 are arranged in their nested condition as shown in FIG. 8.

It is important to note that the rear stacking sockets 34 and 36 are each respectively positioned to the inside of the respective side frame members 26 and 28 whereas the front stacking sockets 38 and 40 are each respectively positioned to the outside of the frame members 26 and 28 as best shown in FIGS. 1 and 2. This lateral offset arrangement between the front and rear stacking sockets enables the present units 10 to be inserted one within another for nesting purposes either in their assembled or their unassembled condition (FIGS. 7 and 8) as will be hereinafter explained. In the embodiment of the base frame member 12 shown in FIGS. 1 and 2, this offset socket arrangement is achieved by extending the respective opposite end portions of the front transverse frame member 22 a sufficient distance beyond their intersection with the side frame members 26 and 28, the front stacking sockets 38 and 40 being mounted or attached to the respective end portions of the frame member 22 at a position located laterally outwardly relative to the side frame members 26 and 28. Any other suitable means for locating the front stacking sockets laterally outward of the rear stacking sockets may likewise be utilized in the practice of the present invention.

Figure 6:
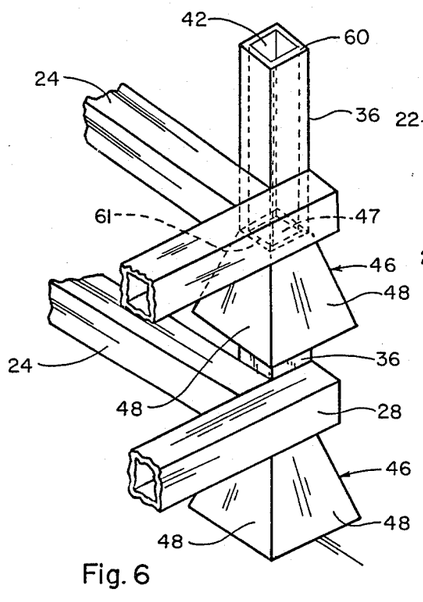
FIG. 6 is a partially enlarged perspective view of a rear portion of the base frame members shown in FIG. 3 showing engagement thereof in the unassembled stacked condition.

The bottom end portion of each stacking socket 34–40 includes means cooperatively engageable with means associated with the upper end portions of the support members 14–20 for vertically stackably arranging a plurality of the present units 10 one upon the other. More particularly, the lower end portion of each of the front stacking sockets 38 and 40 includes a downwardly extending projection or stacking plug 44 (FIGS. 1, 3 and 4) whereas the lower portion of each of the rear stacking sockets 34 and 36 includes target means 46. Each target means 46 includes an opening or aperture 47 (FIG. 6) adaptable for cooperatively receiving and engaging one of the projection means 54 associated with the rear support members 18 and 20. Preferably the respective apertures 47 are formed within the lower end portion of the respective stacking sockets 34 and 36 as shown in FIG. 6, although it is recognized that these apertures may be formed separately from the socket members 34 and 36 such as by attaching a separate member housing such aperture to the lower end portion of each socket 34 and 36. It is also recognized that if the rear stacking sockets 34 and 36 are tubular in shape as shown in FIGS. 1-14, the opening or aperture associated with such tubular construction can be adapted to receive and engage the respective projection means. Any other suitable arrangement for associating a receiving opening with the target means 46 can likewise be utilized.

Figure 12:
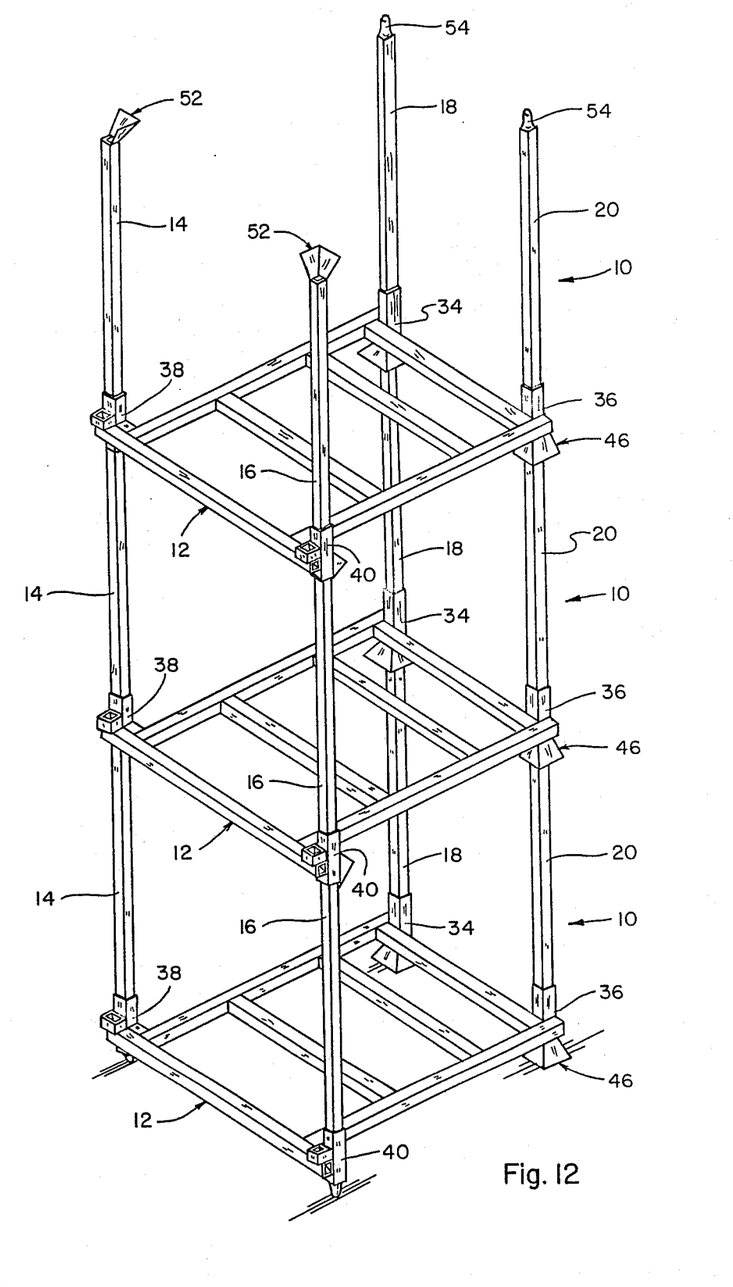
FIG. 12 is a perspective view of a plurality of the present storage racks shown in their stacked assembled condition.
Figure 14:
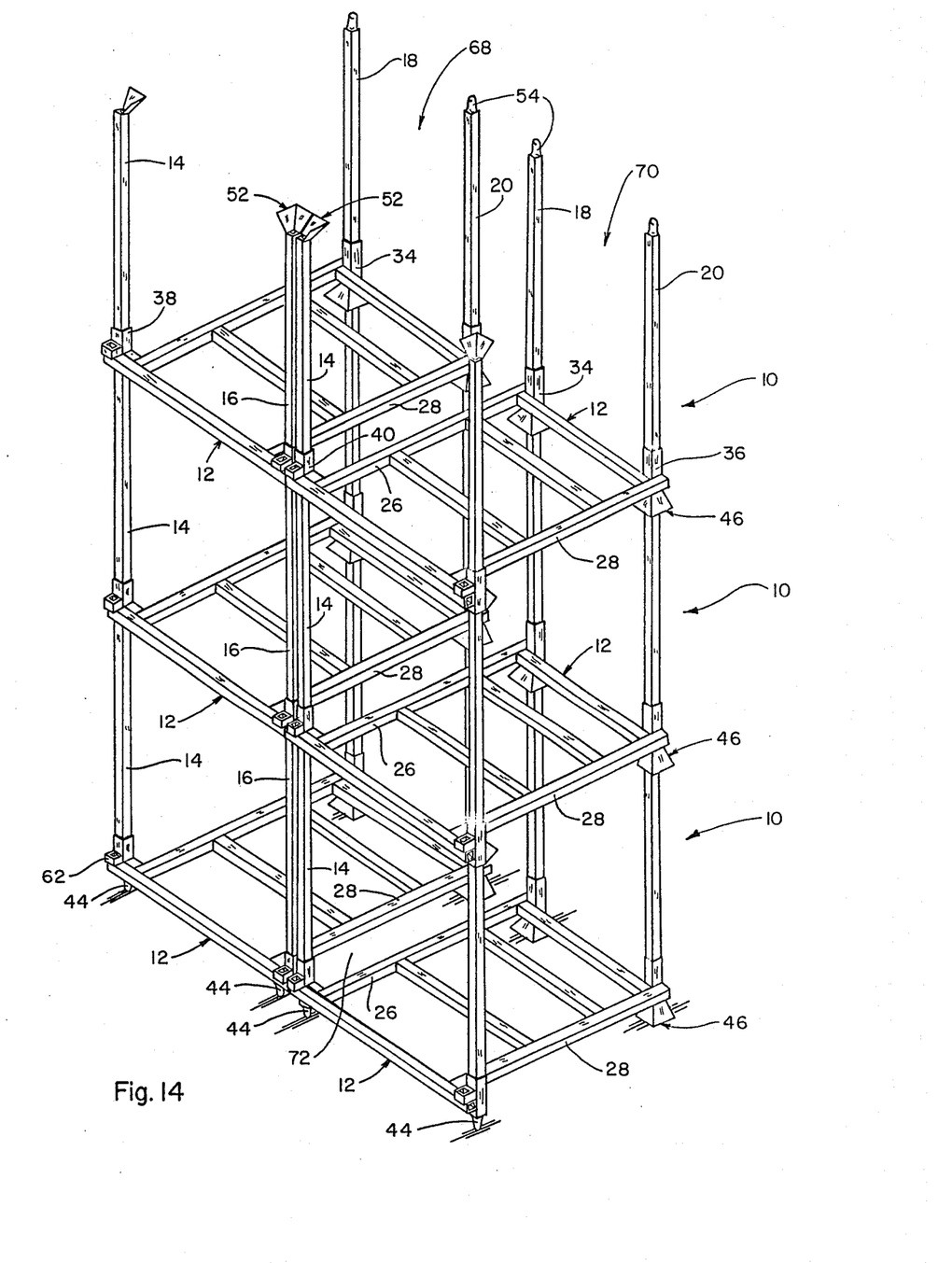
FIG. 14 is a perspective view showing two stacked assemblies of the present storage racks positioned in adjacent side-by-side abutting relationship with each other.

Each base target means 46 also includes a plurality of three flange members 48 extending downwardly and outwardly respectively from the lower portion of the stacking sockets 34 and 36 on three adjacent sides thereof, each flange member 48 angularly extending from the bottom periphery of one of said three adjacent sides as best shown in FIGS. 1 and 2. The flange members 48 define a three-sided funnel-shaped target and function to guide the projection means 54 into proper alignment and engagement with the receiving apertures 47. However, it is recognized that the particular size and shape of the stacking sockets 34 and 36 may be conveniently fashioned into a wide variety of other configurations, for example, a triangular, hexagonal, circular, or other configuration and, if this should occur, the flange members 48 should then be angularly positioned so as to border that portion of the bottom periphery of such newly shaped rear stacking sockets which will not obstruct entry of the projections 54 into the area defined by the target means 46 from a rearward direction as indicated by the direction of the arrows 50 shown in FIG. 2. This is important because the target means 46 will always be maneuvered from front to rear in order to receive and capture the projections 54. It is also important that the respective flange members 48 be positioned so that they do not extend beyond the lateral perimeter of the base member 12 established by the front stacking sockets 38 and 40. This positioning ensures that the rear target means 46 do not interfere with other rack units 10 when such units are placed in side-by-side working relationship with each other as shown in FIG. 14. Also, since the base frame member 12 is supported by both the projection means 44 and the target means 46, it is important that the bottom surfaces associated respectively therewith be in substantial alignment with each other and lie in a substantially level or horizontal plane so that the base frame member 12 can be properly supported on a floor or other supporting surface in a level position. This is particularly important when a plurality of the present units 10 are to be vertically stacked one upon the other as shown in FIGS. 12 and 14.

The upper end portion of the elongated support members 14-20 are constructed such that, when arranged in association with each base frame member 12 and engaged with their respective stacking sockets 34-40, the two forward support members 14 and 16 each include target means 52 while the two rear support members 18 and 20 each include an upwardly extending projection or stacking plug 54 at the respective upper end portions thereof as shown in FIGS. 1 and 2. The projections 54 are substantially similar to the projections 44 and are specifically designed to mate with and engage the receiving opening or aperture 47 associated with each of the rear target means 46. The target means 52 are similar to the target means 46 but differ therefrom in that the targets 52 include an upwardly and outwardly extending flange member 56 located on each of two adjacent sides of the receiving opening 58. The aperture 58 is specifically dimensioned to cooperatively receive and engage the downwardly extending projections 44 associated with the base frame member 12. Similarly, like the flange members 48, the flange members 56 function to guide and funnel the projection means 44 into proper alignment and engagement with the receiving aperture 58. Also, like the size and shape of the stacking sockets 34-40, it is also recognized that the size and shape of the various support members may likewise be conveniently fashioned into a variety of different sizes and configurations. If this should occur, the flange members 56 should then be angularly positioned so as to border that portion of the top periphery of such newly shaped support members which will not obstruct engagement of the projections 44 with the target means 52 from a forward direction as indicated by the direction of the arrows 59 shown in FIG. 1 since the projections 44 will likewise always be maneuvered from front to rear towards the target means 52 during the engagement process. Similarly, it is also important that the flange members 56 be positioned and located such that they do not extend beyond the lateral perimeter of the base member 12 established by the front stacking sockets 38 and 40. This is accomplished by positioning the flange members 56 towards the interior portion of the base frame member 12 as shown in FIG. 1.

Figure 3:
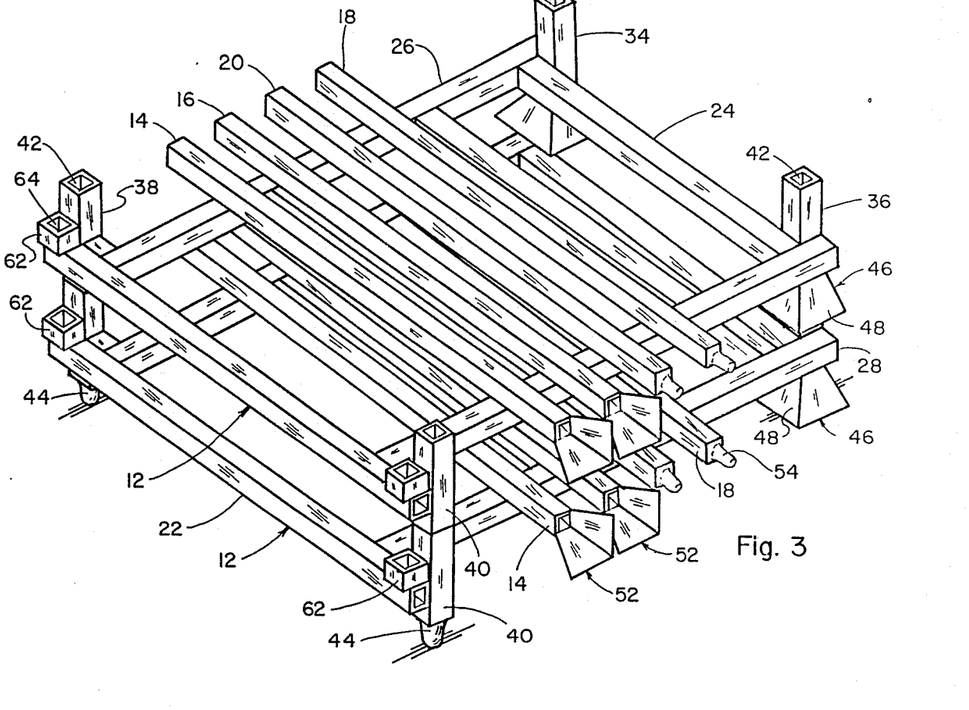
FIG. 3 is a perspective view showing a plurality of the present storage racks stacked in an unassembled condition.
Figure 4:
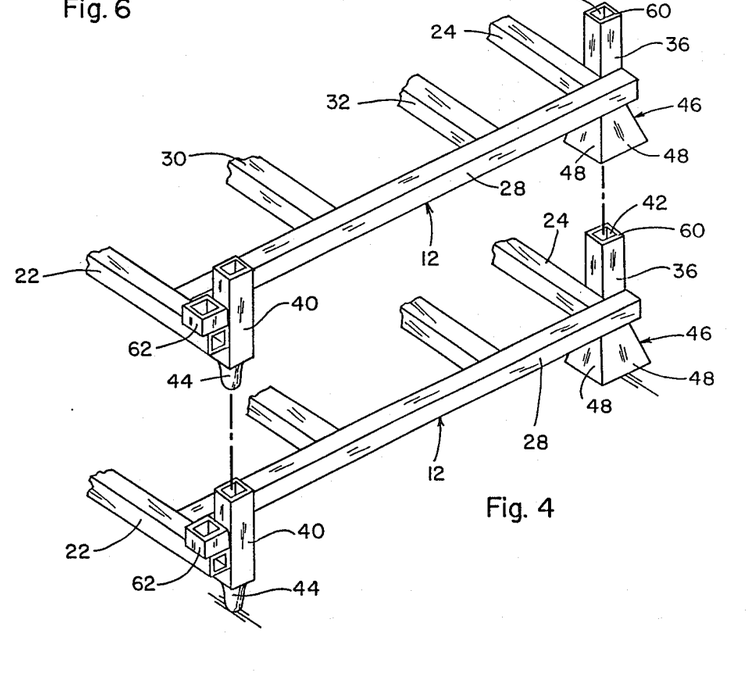
FIG. 4 is an exploded partial perspective view showing how the base frame members of the present storage rack are arranged one above the other for mating engagement with each other in the unassembled stacked condition shown in FIG. 3.
Figure 5:
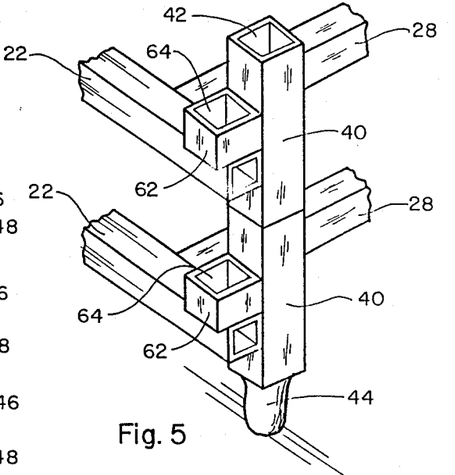
FIG. 5 is a partially enlarged perspective view of a front portion of the base frame members shown in FIG. 3 showing engagement thereof in the unassembled stacked condition.

FIG. 3 illustrates how the present storage rack 10 can be arranged in a stacked unassembled condition for storage and/or transportation. When the support members 14-20 are disengaged from their respective stacking sockets 34-40, the base frame members 12 can be stacked one upon the other as shown in FIGS. 3-6. This stacking arrangement is accomplished by aligning the frame members 12 as shown in FIG. 4, the forward stacking sockets 38 and 40 of one base member 12 being aligned to cooperatively receive and engage the projections 44 associated with the next adjacent member 12 positioned immediately thereabove and, at the same time, the rear stacking sockets 34 and 36 of the lower base member 12 being aligned to cooperatively engage the target means 46 associated with the next adjacent member 12 as best shown in FIGS. 5 and 6. In this regard, the rear base target flange members 48 are positioned and arranged adjacent the three respective sides associated with the lower portion 61 of the rear stacking sockets 34 and 36 such that the upper surface portion 60 of each socket 34 and 36 mates substantially flush with the respective lower surface portions 61 as best shown in FIG. 6. This ensures stable, level stacking of one base frame member 12 upon another as shown in FIG. 3. Once the base frame members 12 are stacked as shown in FIGS. 3-6, the support members 14-20 associated with each base frame member 12 may be positioned between and across the superimposed base members 12 as shown in FIG. 3. This stacking of the present storage racks 10 in their unassembled condition may be continued to achieve any desired height and provides for maximum utilization of space and an orderly and efficient means for either storing or transporting the rack assemblies 10.

Figure 7:
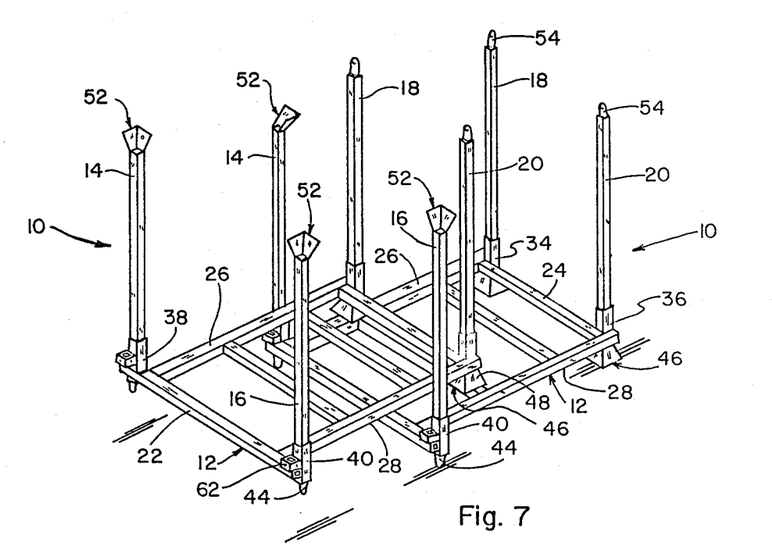
FIG. 7 is a perspective view of two of the present storage racks shown in the assembled condition, one storage rack being partially inserted within the other during movement to the nested assembled condition.

FIGS. 7 and 8 illustrate how the present storage racks 10 can be easily and orderly nested in their fully assembled condition. Since the front stacking sockets 38 and 40 are positioned respectively laterally outwardly from the rear stacking sockets 34 and 36, the forward support members 14 and 16 are similarly so positioned relative to the rear support members 18 and 20. This means that the rear support members 18 and 20 of one unit 10 will fit between the front support members 14 and 16 of another unit 10 and therefore a fully assembled storage rack 10 can be slidably positioned and inserted within another such unit as shown in FIGS. 7 and 8. In order to achieve a stable nested condition, a nesting socket 62 is provided adjacent each of the forward stacking sockets 38 and 40 as best shown in FIGS. 1-5 and FIGS. 7-10. Each nesting socket 62 includes an opening or aperture 64 adaptable for cooperatively receiving and engaging the downwardly extending projections 44 associated with each base frame member 12 and provide a seat for such projections 44 when the nesting configuration is desired. The location of the nesting sockets adjacent to, but forward from, the respective stacking sockets 38 and 40 enables the present units 10 to be easily nested one upon and within another in either an assembled or an unassembled condition. Each nesting socket 62 may also be mounted so as to rest upon the front transverse frame member 22 (FIGS. 5 and 10) so as to provide additional support to the socket 62 when under a load bearing condition. This is particularly important when a large plurality of storage racks 10 are nested one upon and within another.

Figure 9:
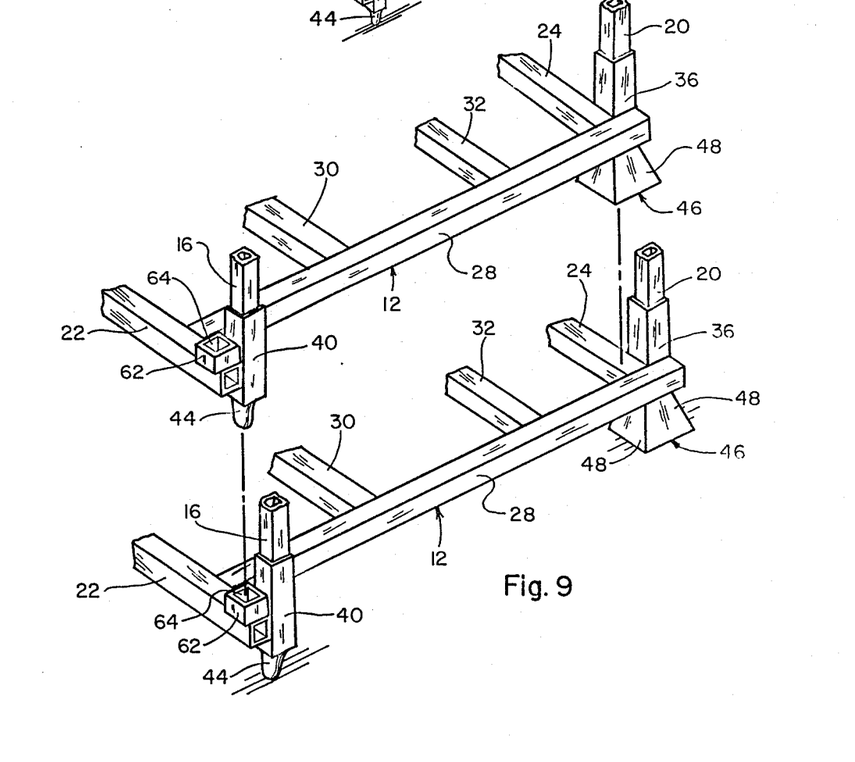
FIG. 9 is an exploded partial perspective view showing how the base frame members of the present storage rack are arranged one above the other for mating engagement with each other in the nested condition shown in FIG. 8.
Figure 10:
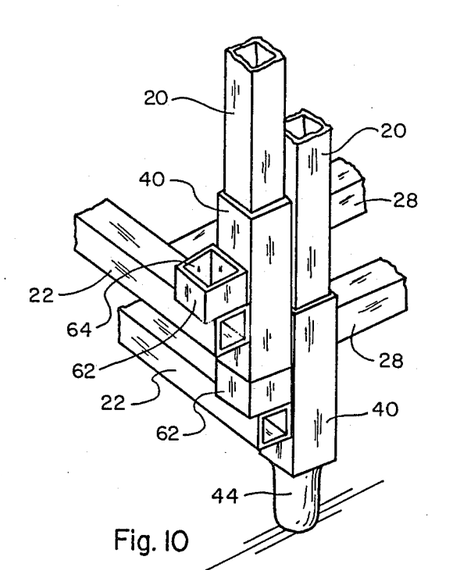
FIG. 10 is a partially enlarged perspective view of a front portion of the base frame members shown in FIG. 8 showing engagement thereof in the nested condition.
Figure 11:
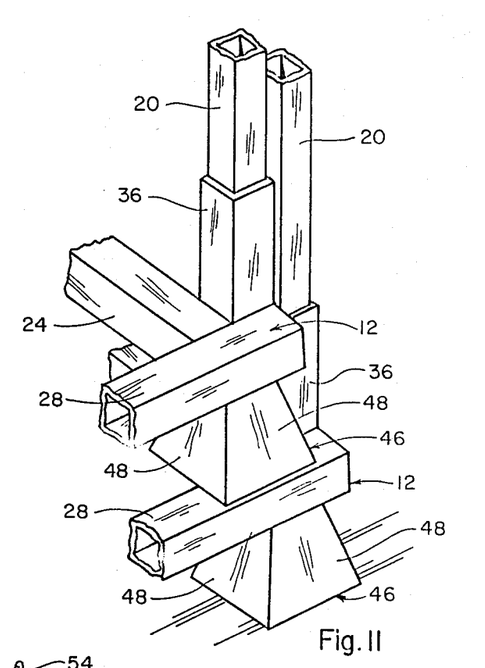
FIG. 11 is a partially enlarged perspective view of a rear portion of the base frame members shown in FIG. 8 showing the positioning of the base target means in the nested condition.

The nested position is achieved by aligning the base frame members 12 as shown in FIG. 9 such that the respective nesting socket openings 64 cooperatively receive and engage the respective projections 44 associated with the base frame member 12 positioned thereabove. As shown in FIGS. 8, 9 and 11, when the present units 10 are maneuvered into their nested configuration, the design and location of the rear base target means 46 is such that the target means 46 of one unit are fully supported by and rest upon the respective base side frame members 26 and 28 of the adjacent unit located immediately therebelow. This provides an adequate bearing surface for the rear portion of the nested units and provides both support and stability for the nesting of a plurality of storage units 10. FIG. 10 illustrates the mating relationship between the nesting sockets 62 and the projection means 44 and FIG. 11 illustrates the mating relationship between the target means 46 and one of the side frame members 28. Although FIGS. 7-11 illustrate the nesting mode of two fully assembled units 10, it is likewise recognized that the present units 10 can be nested in their unassembled condition. In this situation, the support members 14-20 can be stored and positioned between and across the superimposed base frame members 12 similar to the arrangement illustrated in FIG. 3. Since the nesting sockets 62 are positioned in front of the forward stacking sockets 38 and 40, when nested in either the assembled or the unassembled condition, the base frame members 12 will be offset or staggered as shown in FIG. 8.

The nesting of assembled units 10 as illustrated in FIG. 8 enables a user to quickly and easily store the present units 10 in their fully assembled condition so that such units are readily available for immediate use without having to reassemble the same. This is highly desirable because it minimizes the time needed to place such units into a working and operational environment. In addition, although the unassembled stacked condition of the present rack assemblies 10 as illustrated in FIG. 3 requires less space depthwise as compared to when the units 10 are nested in their unassembled condition, the ability to likewise nest the present units 10 in an unassembled condition provides a user with still another option when determining how to store and/or transport the present units. Also, the construction of the present storage racks 10 permits assembled units to be nested without having to lift one unit completely up and over the top of another unit to achieve the nesting configuration as is required by some of the known prior art constructions. Additionally, since the projections 44 of one base member 12 engage the nesting sockets 62 of the adjacent base member positioned immediately therebelow, the nested assembly of the present units 10 is relatively more stable and resistant to toppling or collapse. Still further, the construction of the present units 10 also facilitates quick and easy removal of the nested units one from another as the uppermost nested unit need only be lifted a sufficient height above the adjacent assembly located therebelow so as to disengage the projections 44 from the nesting sockets 62.

FIG. 12 illustrates the present storage racks 10 vertically stacked in their assembled condition for use in a warehouse or other storage environment. The stacked assembled condition is achieved by simultaneously manuevering the projections 44 of the upper unit into engagement with the receiving apertures 58 associated with the target means 52 located on the unit positioned therebelow while, at the same time, manuevering the receiving apertures 47 associated with the rear base target means 46 of the upper unit into engagement with the projections 54 of the lower unit. Since the vertical stacking of the present units 10 is normally accomplished by use of a forklift type vehicle, proper alignment of the projections 44 and 54 with their respective receiving apertures is often times difficult due to impairment of the vehicle operator's vision inherent in such an operation. For this reason, the target means 46 and 52 are provided to help guide and funnel the projections 44 and 54 into proper alignment and engagement with their receiving apertures. It is therefore important that the rear base target flange members 48 be positioned on the three adjacent sides of the stacking sockets 34 and 36 as shown in FIG. 2 such that the unobstructed side thereof is located at the rear thereof. This means that a forklift type vehicle operator can easily manuever the base member 12 from a fore to an aft position such that the projections 54 will be located somewhere within the area defined by and between the downwardly and outwardly extending flange members 48. Since the flange members 48 are angularly related relative to the lower side portions of the receiving sockets 34 and 36, a broader target area is provided and therefore a greater latitude and a greater margin of error exists when attempting to align the projection means 54 with the receiving apertures 47. Once the projections 54 are located within the space defined by target means 46, the base member 12 can be lowered and engagement of the projections 54 with any one of the flange members 48 will guide and funnel the projections 54 into engagement with the receiving apertures 47 located respectively therewithin. Direct alignment of the projections 54 and apertures 47 is therefore not necessary.

Figure 13:
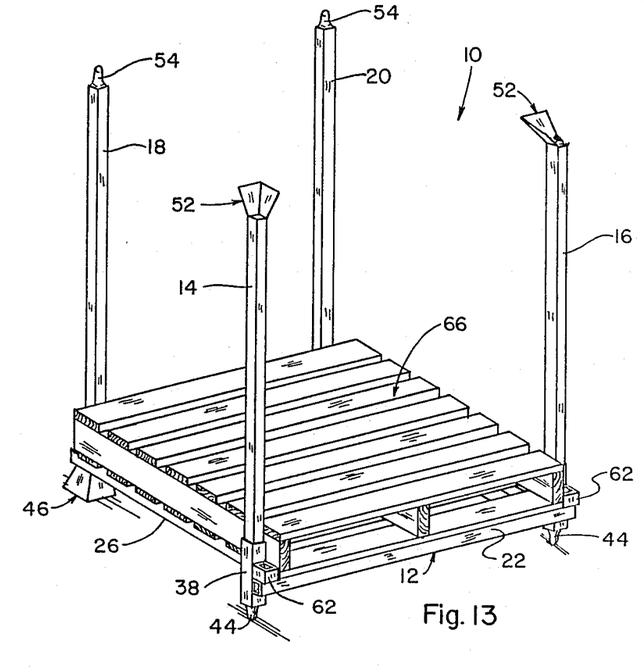
FIG. 13 is a perspective view of one of the present storage racks showing use of a pallet therewith.

Similarly, the positioning of the target flange members 56 adjacent the rear and interior side portion of the support members 14 and 16 as shown in FIG. 1 is likewise important since the target means 52 is specifically designed to both stop and guide the projections 44 into engagement with the receiving apertures 58 as one unit is being maneuvered relative to another from front to rear by the vehicle operator. Again, the angular orientation of the flange members 56 relative to the respective sides of the support members 14 and 16 provide a substantially broader target area for capturing the projections 44. The positioning of one of the flange members 56 along the interior side portion of the respective support members 14 and 16 serves a two-fold purpose. First, such positioning helps to improve the visual capabilities of the vehicle operator manuevering the respective units 10 into proper engagement with a unit located therebelow and, secondly, such positioning enables the target means 52 to extend wholly within the outside perimeter of the base member 12 established by the forward receiving sockets 38 and 40. The construction of the respective target means 46 and 52 therefore provide a substantially broader target area for aligning the projection means 44 and 54 with the cooperatively engageable openings located therewithin for facilitating the vertical assembly thereof. The stacking of one unit 10 upon another as described above may be continued to achieve any desired height. Once the present units 10 are vertically assembled as shown in FIG. 12, they are ready to accept the storage of goods and materials thereon. Depending upon the nature of the goods and materials to be stored, such items can be placed directly upon the framework structure of the base frame members 12 or any one of a multitude of different pallet constructions such as the pallet member 66 shown in FIG. 13 may be utilized in conjunction with the respective base frame members 12 to achieve a suitable surface for accommodating the particular goods and/or materials to be stored thereupon.

In order to improve stability and ridigity when vertically stacking a plurality of the present storage racks 10 as shown in FIGS. 12 and 14, the front stacking sockets 38 and 40 may be optionally mounted at a slight angle away from the respective side frame members 26 and 28 so that the top portion of the stacking sockets are slightly offset laterally outwardly relative to the lower portion thereof. This offset or tow-out angle is measured from a vertical axis passing through the respective front stacking sockets and is in the range of approximately 1° to 2°. This offset arrangement helps to assure proper target attitude with respect to the target means 52 during the alignment process and further ensures that the targets 52 are positioned directly below the projection means 44 associated with a base member 12 positioned thereabove as such members are being inserted into engagement with each other. When one base frame member 12 is engaged with the support members 14–20 located immediately therebelow, engagement of the projections 44 with the receiving apertures 58 will cause the upper end portion of the front support members 14 and 16 to be drawn slightly inwardly towards the interior of the base member 12 thereby making a firm, tight connection therebetween. This assures solid engagement of the respective adjacent units and makes the stacked assembly more resistance to any external force which could be placed on the assembly and cause the same to collapse. This arrangement also helps to negate any looseness which may exist between the projections 44 and the apertures 58 when engaged.

FIG. 14 illustrates how two stacked assemblies 68 and 70 of the present storage racks 10 can be positioned in adjacent side-by-side abutting relationship with each other in a working environment. Since the target means 46 and 52 are specifically designed so as not to extend or protrude beyond the outside perimeter of the base frame member 12 as previously explained, the support members 14 and 16 associated with respective adjacent assemblies 68 and 70 can be positioned in abutting relationship with each other as shown in FIG. 14 without having any members from either assembly interfere with or protrude into the other assembly. This is important because such positioning maximizes the utilization of available space and eliminates wasted or unusuable space between such units which often occurs with the prior art constructions. In this regard, the space 72 (FIG. 14) defined by and between the adjacent side frame members 26 and 28 is totally contained within the adjacent units 10 and can be effectively utilized depending upon the particular goods and/or materials to be stored on such units. It is also important to note that the positioning of the target flange members 56 is such that adjacent target means 52 do not interfere with one another when the assemblies 68 and 70 are placed in adjacent abutting relationship with each other. Any other arrangement of the flange members 56 would obviate the advantages and objectives gained by the present construction.

Figure 15:
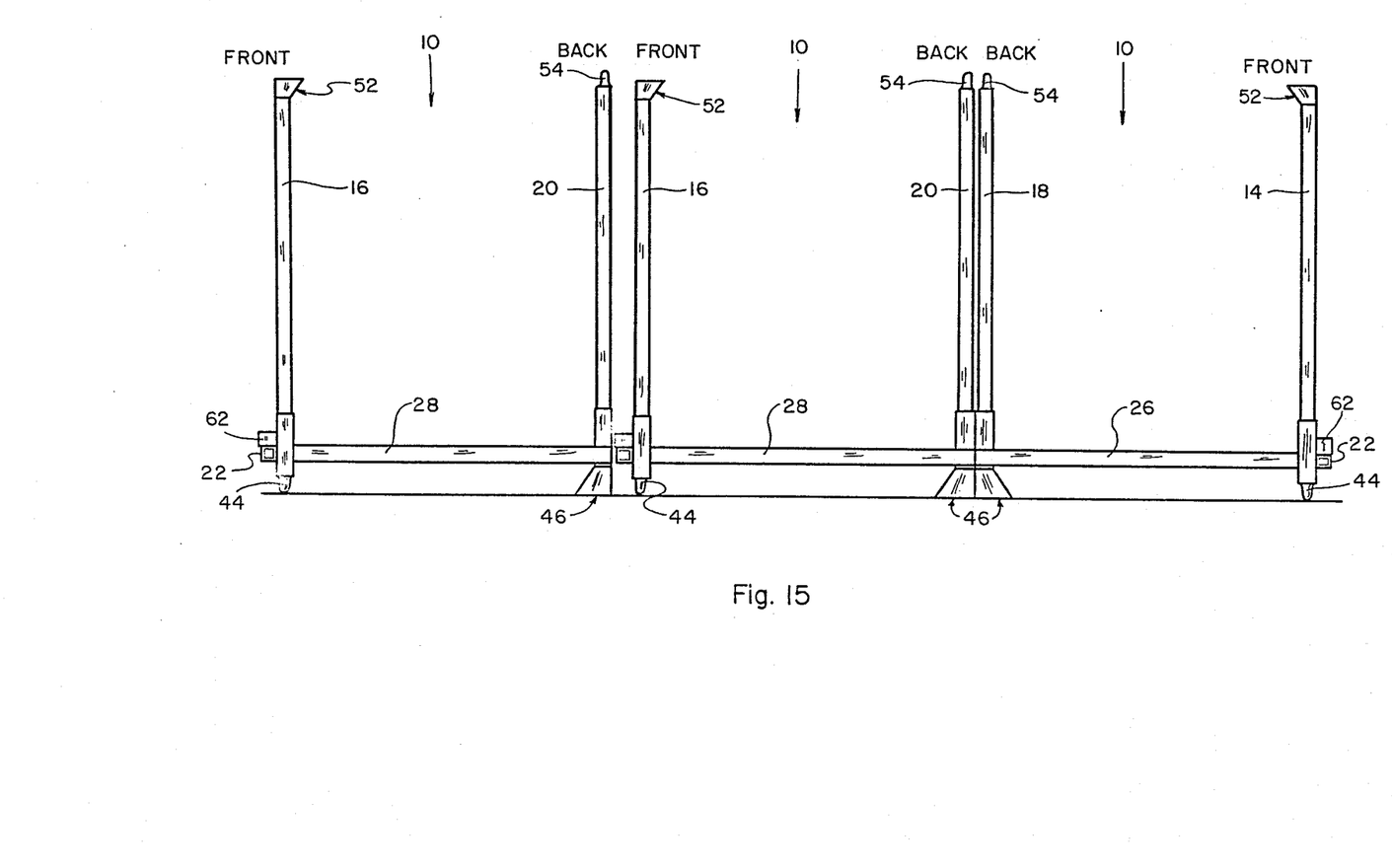
FIG. 15 is a side elevational view showing a plurality of the present storage racks positioned in adjacent back-to-front and adjacent back-to-back abutting relationship with each other.

Since the target means 46 and 52 do not extend or protrude beyond the outside perimeter of the base frame member 12, the present storage racks 10 can also be positioned depthwise in adjacent abutting relationship with each other as shown in FIG. 15. Because of its unique design, the units 10 can be positioned in either a back-to-front arrangement or a back-to-back arrangement without having any members from any unit interfere with or protrude into an adjacent unit. This enables the present units 10 to be arranged in adjacent abutting relationship with each other both fore-and-aft and side-by-side so as to achieve any desired storage array.

Although it is recognized that various acceptable materials of construction are available and could equally be employed to fabricate the various components of the present storage rack 10, it is usually preferred that such components be casted from steel or other durable materials such as certain other metal alloys which are able to withstand moderate impact and mishandling and supply the necessary strength and rigidity depending upon the particular application and the load carrying capacity desired. It is also recognized that certain relatively strong plastic materials as well as other types of materials may likewise be utilized in fabricating many, if not all, of the components of the present units so long as such materials are able to withstand the desired load carrying capacity of such units.

It is also important to note that the overall dimensions of the present storage rack 10 as well as the configuration of the base frame member 12 is subject to wide variations and the present units 10 may be sized and shaped into a variety of different sizes and configurations, for example, a triangular, hexagonal, circular, or other configuration, so as to be compatible with the size and shape of a particular pallet member which will be used in conjunction therewith, or to conform with any other space limitation without impairing the teachings and practice of the present construction. Although the present rack assembly has particular utility in a warehouse type environment, its simplicity, durability, flexibility and versatility greatly increases its usefulness and effectiveness in a wide variety of other storage applications.

Thus, there has been shown and described a novel storage rack construction which is both stackable and nestable in an assembled as well as an unassembled condition, which storage rack fulfills all of the objects and advantages sought therefor. Many changes, modifications, variations, and other uses and applications of the present construction will, however, become apparent to those skilled in the art after considering this specification and the accompanying drawings. All such changes, modifications, variations, and other uses and applications which do not depart from the spirit and scope of the invention are deemed to be covered by the invention which is limited only by the claims which follow.

What is claimed is:

1. A storage rack for storing goods and/or materials in a stackable arrangement thereon comprising a base member having front, rear and opposed side portions and a substantially horizontally disposed floor portion extending therebetween, first and second pairs of leg members each having upper and lower end portions respectively, said first pair of leg members positioned adjacent said rear base portion at locations near the respective opposite ends thereof, said second pair of leg members positioned adjacent said front base portion at locations near the respective opposite ends thereof, each of said leg members including socket means located at the upper end portions thereof, first and second pairs of elongated support members each having upper and lower end portions respectively, said first pair of support members each having its lower end portion removably engageable with the socket means associated with said first pair of leg members, said second pair of support members each having its lower end portion removably engageable with the socket means associated with said second pair of leg members, said first pair of support members each including projection means extending upwardly from adjacent the upper end portion thereof, said second pair of support members each including target means located adjacent the upper end portion thereof, said base member including projection means extending downwardly from adjacent the lower end portion of each of said second pair of leg members, said base member further including target means extending downwardly from adjacent the lower end portion of each of said second pair of support members including an aperture adaptable for cooperatively receiving the projection means associated with the lower end portion of each of said second pair of leg members, the lower end portion of each of said first pair of leg members including an aperture adaptable for cooperatively receiving the projection means associated with the upper end portion of each of said first pair of support members, a plurality of said storage racks being vertically stackably arranged one upon the other by engaging the projection means and target means associated with the support members of one of said storage racks with the projection means and target means associated with the base member of another of said storage racks, the socket means of said second pair of leg members associated with one of said base members being removably engageable with the base projection means associated with a similarly constructed base member and the socket means of said first pair of leg members associated with said one base member being removably receivable within the base target means associated with said similarly constructed base member when said similarly constructed base member is positioned in mating relationship above said one base member, said target means associated with each of said second pair of support members including flange means extending in angular relation from adjacent the upper end portion of said support members on two adjacent sides thereof, said base target means including flange means extending in angular relation from adjacent the lower ends of said first pair of leg members on three adjacent sides thereof.

2. The storage rack of claim 1 wherein said base member is substantially rectangular in shape, said leg members being located at approximately each of the respective corners thereof.

3. The storage rack of claim 1 including nesting means located adjacent said second pair of leg members, said nesting means including means for cooperatively receiving the projection means associated with the lower end portion of each of said second pair of leg members.

4. The storage rack of claim 1 wherein each of the leg members of said first pair of leg members is respectively positioned laterally inwardly relative to the respective side portions of said base member, and each of the leg members of said second pair of leg members is respectively positioned laterally outwardly relative to the respective side portions of said base member.

5. The storage rack of claim 1 wherein said leg members and said support members are substantially rectangular in cross-section.

6. The storage rack of claim 1 wherein each of the leg members associated with said second pair of leg members is angularly oriented relative to the respective side portions of said base member.

7. The storage rack of claim 1 wherein all of said target means are positioned and dimensioned so as not to extend beyond the perimeter of said base member.

8. A storage rack for storing goods and/or materials in a stackable arrangement thereon comprising a base member having front, rear and opposed side portions and a substantially horizontally disposed floor portion extending therebetween, first and second pairs of elongated support members each having upper and lower end portions respectively, said first pair of support members being positioned adjacent the rear base portion at locations near the respective opposite ends thereof, said second pair of support members being positioned adjacent the front base portion at locations near the respective opposite ends thereof, each of the support members associated with said first pair of support members being respectively positioned laterally inwardly relative to the respective side portions of said base member, each of the support members associated with said second pair of support members being respectively positioned laterally outwardly relative to the respective side portions of said base member, said first pair of support members each including projection means extending upwardly from adjacent the upper end portion thereof, said second pair of support members each including target means located adjacent the upper end portion thereof, said base member including projection means extending downwardly from adjacent the lower end portion of each of said second pair of support members, said base member further including target means extending downwardly from adjacent the lower end portion of each of said first pair of support members, the upper end portion of each of said second pair of support members including an aperture adaptable for cooperatively receiving the projection means associated with the lower end portion thereof, the lower end portion of each of said first pair of support members including an aperture adaptable for cooperatively receiving the projection means associated with the upper end portion thereof, a plurality of said storage racks being vertically stackably arranged one upon the other by engaging the projection means and target means associated with the upper end portions of the support members of one of said storage racks with the projection means and target means associated with the base member of another of said storage racks, said target means associated with each of said second pair of support members including flange means extending in angular relation from adjacent the upper end portion of said support members on two adjacent sides thereof, said base target means including flange means extending in angular relation from adjacent the lower end portion of each of said first pair of support members on three adjacent sides thereof, all of said target means being positioned and dimensioned so as not to extend beyond the perimeter of said base member, nesting means located adjacent said second pair of support members, said nesting means including means for cooperatively receiving the base projection means associated with the lower end portion of each of said second pair of support members, the base projection means associated with one of said storage racks being removably engageable with the nesting means associated with a similarly constructed storage rack and the base target means associated with said one storage rack being supported by and resting upon the opposed side portions of the base member associated with said similarly constructed storage rack when said one storage rack is slidably positioned in nesting relationship within said similarly constructed storage rack.

* * * * *

UNITED STATES PATENT OFFICE
CERTIFICATE OF CORRECTION

Patent No. 4,773,547      Dated September 27, 1988

Inventor(s) Ferris A. Bell

It is certified that error appears in the above-identified patent and that said Letters Patent are hereby corrected as shown below:

In the Abstract, line 22, "unasembled" should be --unassembled--.

Column 4, line 52, after "rack", insert --shown--.

Column 5, line 36, "stcrage" should be --storage--.

Column 5, line 49, "frort" should be --front--.

Column 7, line 7, "ccoperatively" should be --cooperatively--.

Column 8, line 59, "tne" should be --the--.

Column 13, line 54, after "said", insert --first pair of leg members, the upper end portion of each of said--.

Signed and Sealed this

Thirty-first Day of January, 1989

*Attest:*

DONALD J. QUIGG

*Attesting Officer*     *Commissioner of Patents and Trademarks*